June 8, 1954 D. N. OBENSHAIN 2,680,298
CONTINUOUS DIGESTER CHIP LEVEL INDICATOR
Filed Dec. 6, 1951 5 Sheets-Sheet 1

Inventor
DAVID NOEL OBENSHAIN

By Moses, Nolte, Crews & Berry
Attorneys

June 8, 1954   D. N. OBENSHAIN   2,680,298
CONTINUOUS DIGESTER CHIP LEVEL INDICATOR
Filed Dec. 6, 1951   5 Sheets-Sheet 3

Inventor
DAVID NOEL OBENSHAIN
Attorneys

June 8, 1954 D. N. OBENSHAIN 2,680,298
CONTINUOUS DIGESTER CHIP LEVEL INDICATOR
Filed Dec. 6, 1951 5 Sheets-Sheet 4

Inventor
DAVID NOEL OBENSHAIN

Attorneys

June 8, 1954 D. N. OBENSHAIN 2,680,298
CONTINUOUS DIGESTER CHIP LEVEL INDICATOR
Filed Dec. 6, 1951
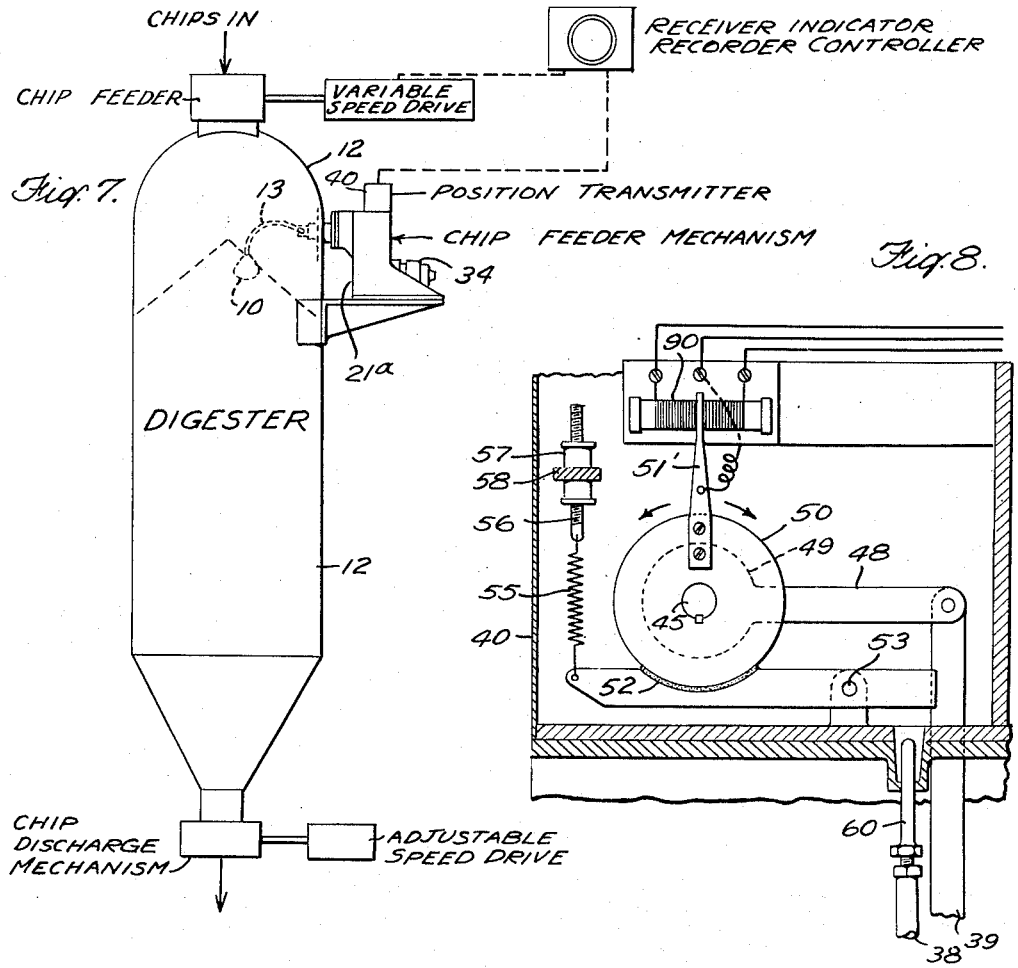
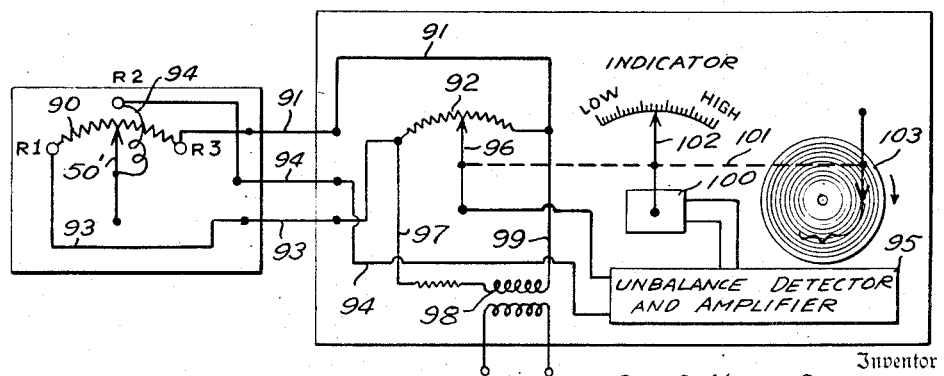
Inventor
DAVID NOEL OBENSHAIN Patented June 8, 1954

2,680,298

UNITED STATES PATENT OFFICE 2,680,298

CONTINUOUS DIGESTER CHIP LEVEL INDICATOR

David Noel Obenshain, Piedmont, W. Va., assignor to West Virginia Pulp and Paper Company, New York, N. Y., a corporation of Delaware Application December 6, 1951, Serial No. 260,271

9 Claims. (Cl. 33—126)

My present invention relates to level-indicating and regulating devices for piles of divided solids or semi-solids and is applicable generally to such material, the nature of which is such that a float-actuated device cannot be used. More specifically my invention relates to devices for indicating the level of chips in a digester for making pulp and is particularly applicable to situations wherein the pile of material is enclosed within a liquid filled pressure vessel, for example.

It is therefore a principal object of my invention to provide a level indicator employing a feeler device or tamper making periodic contact with the pile and having means for registering the level of the pile as revealed by the lowermost travel of the tamper. It is a further object of my invention to have such registering means actuate an improved servo-mechanism acting to operate a conventional feed mechanism to alter the height of the pile. Other objects of my invention and advantages thereof will be apparent as the description proceeds.

My invention will be best understood by reference to the following detailed description taken with the annexed drawings, in which Figure 1 is a fragmentary plan view of a preferred embodiment of the indicator and servo-mechanism with the digester shell cut away so as to reveal the feeler and feeler arm;

Figure 7 shows a digester with my improved level indicator-regulator attached;

Figure 8 shows an alternate servo-mechanism for actuating the flow controller; and Figure 9 is a circuit diagram for the device of Fig. 8.

Figures 1, 2:
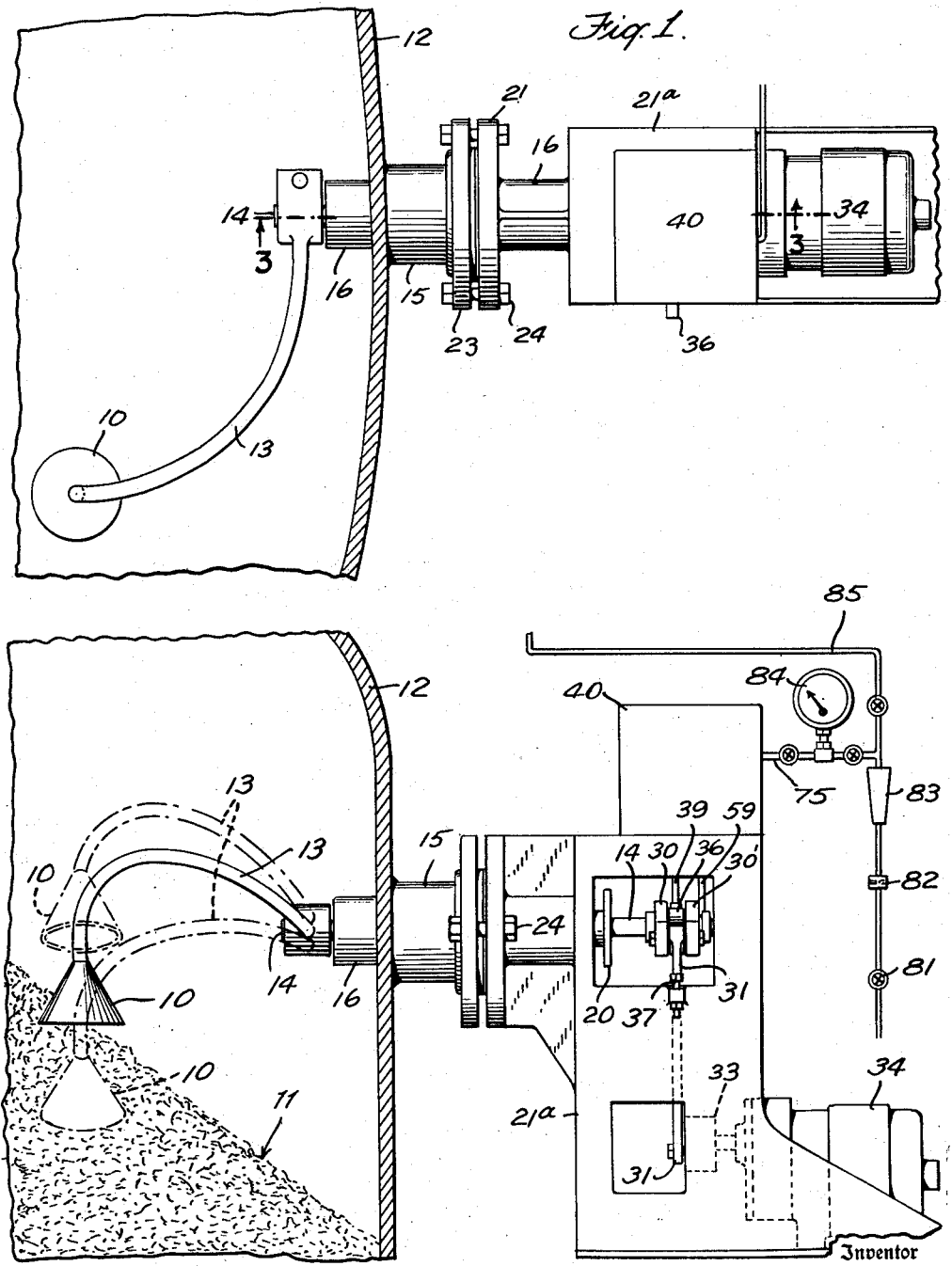
Figure 2 is a fragmentary view in vertical elevation similar to Fig. 1, also having the digester cut away to reveal the feeler and feeler arm.

Reference to Figures 1 and 2 shows the feeler or tamper 10 which is brought toward and away from the pile 11 within the shell 12 of the digester by means of the feeler arm 13 attached to shaft 14 by any suitable means, as by the usual split collar and key arrangement usual in the art.

Figure 3:
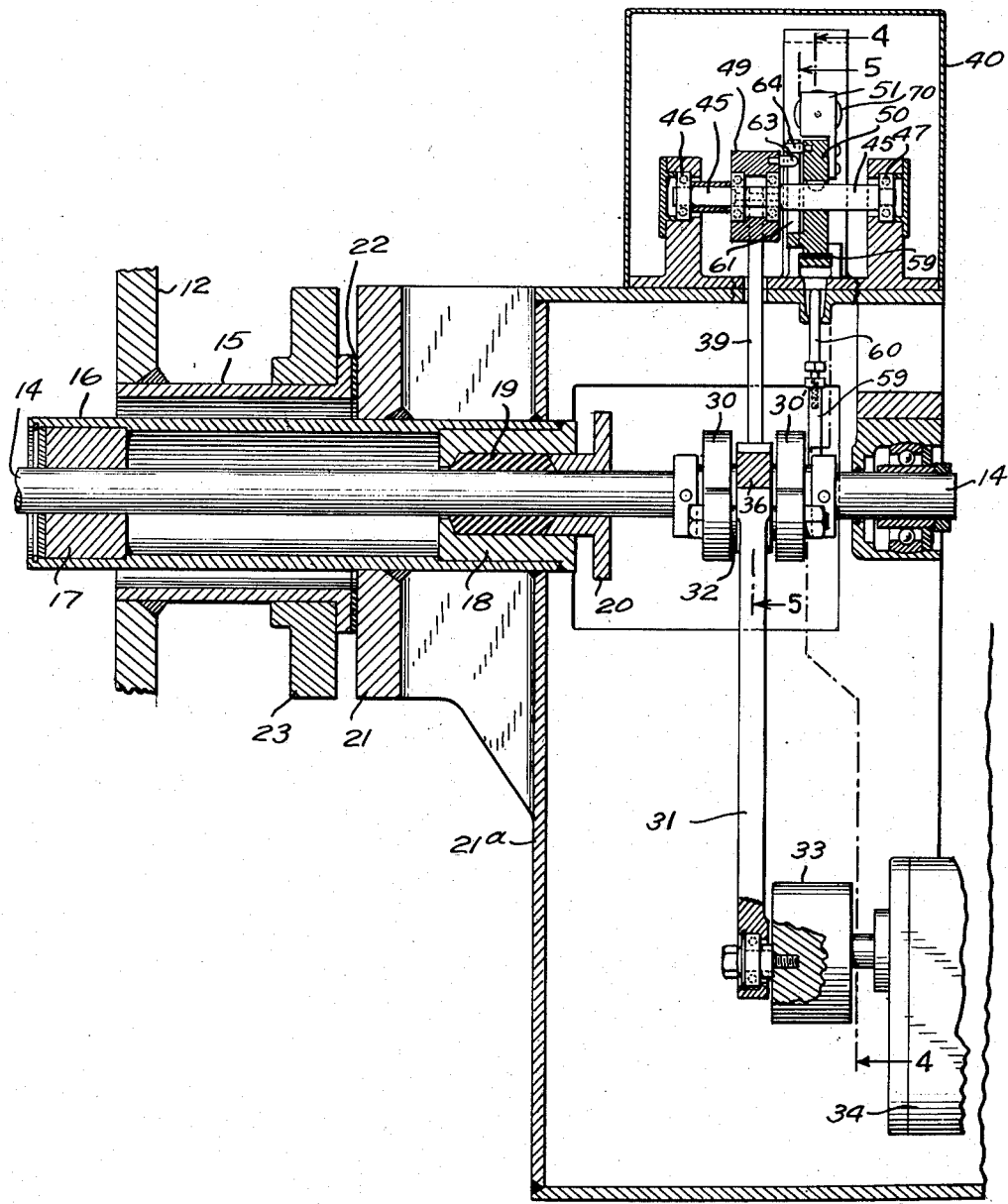
Figure 3 is an enlarged view taken on line 3—3 of Fig. 1 of so much of the device as is outside the digester.

Figure 3 shows how the device as a whole may be attached to the digester by means of an outer sleeve 15 extending through the digester wall 12 and welded thereto. The shaft 14 is contained within a second sleeve 16 within sleeve 15, said shaft passing through a bearing 17 at one end and a bushing 18 at the other end containing packing 19 and packing follower 20. Welded to sleeve 16 is a flange 21 integral with housing 21a, flange 21 being connected by gasket 22 to the flanged end of sleeve 15 against which is disposed a flange ring 23. By connecting the flange ring 23 with the flange 21 by bolts 24, the entire assembly may thus be held securely to the digester shell 12.

It will be understood that means will be provided to rotate shaft 14 so as to rise the feeler, and to permit the feeler to descend freely (through liquid if present) into contact with the pile 11. Means for accomplishing this will now be described.

Figure 4:
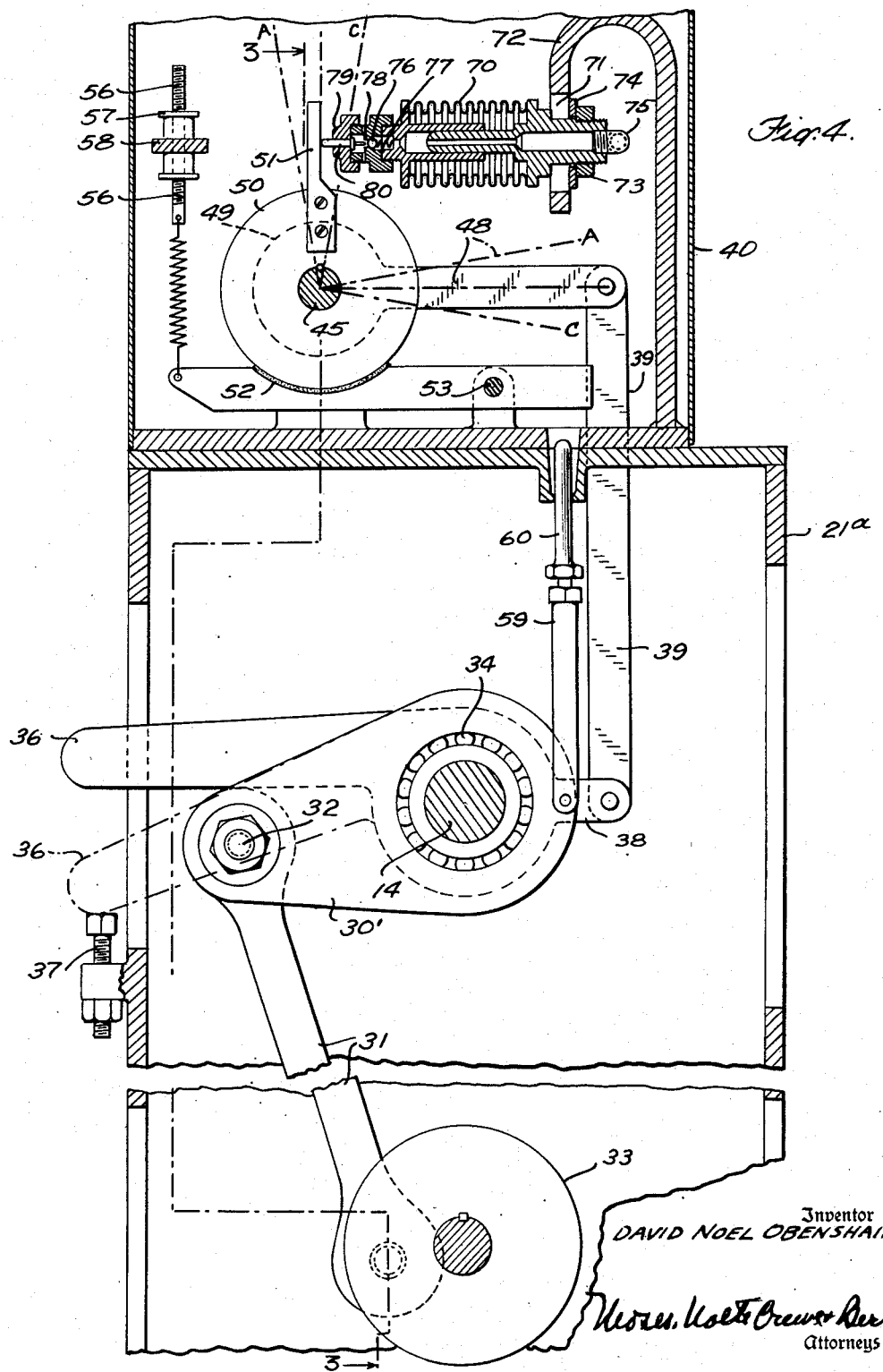
Figure 4 is an enlarged view in vertical section taken on line 4—4 of Fig. 3.
Figures 5, 6:
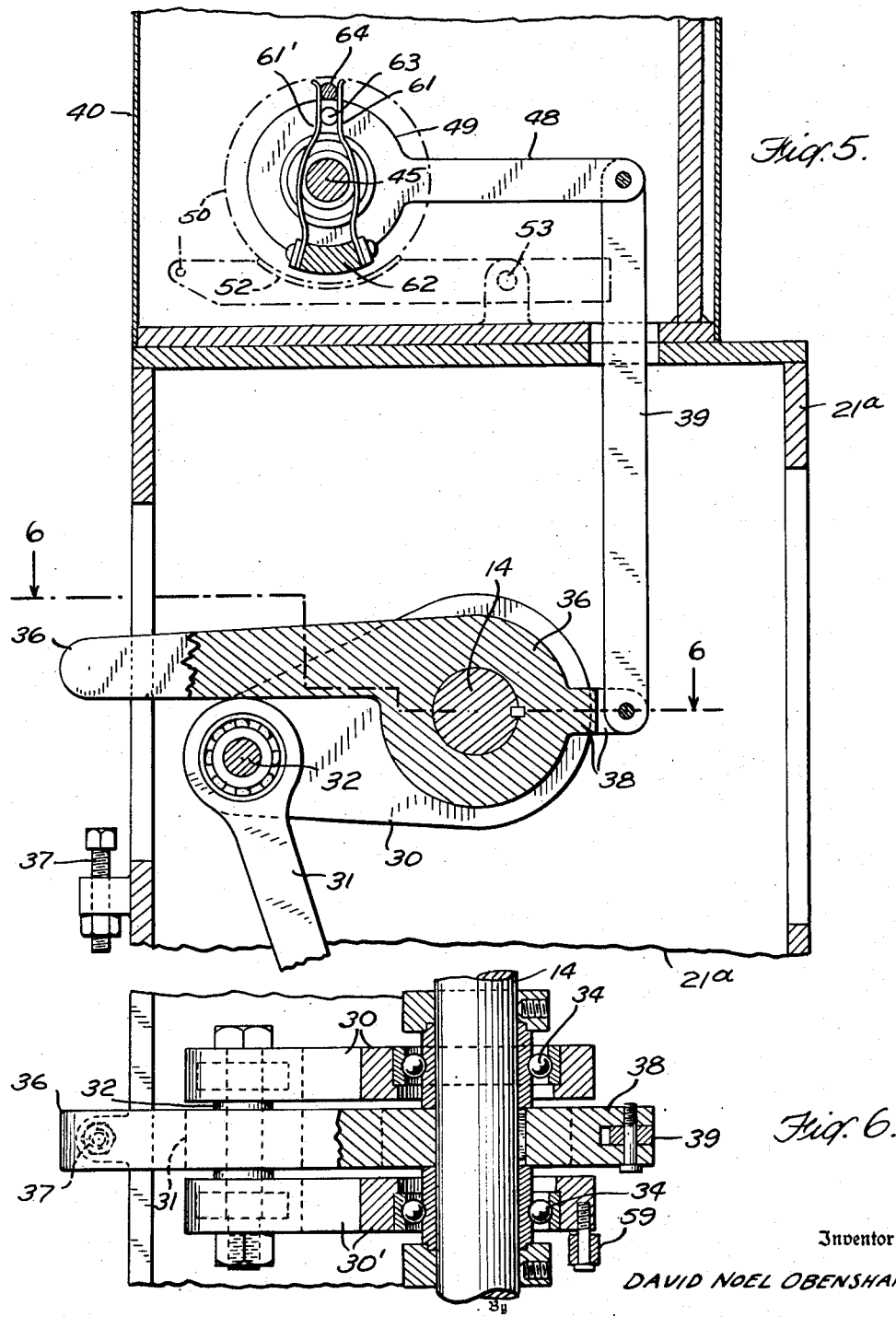
Figure 5 is a view taken on line 5—5 of Fig. 3.
Figure 6 is a sectional view taken on line 6—6 of Figure 5.

To thus actuate the shaft, a pair of rocking links 30, 30' (Figs. 6, 5 and 4) are rocked by being joined to a connecting rod 31, through pin 32, the other end of the connecting rod 31 being attached to crank head 33 driven by motor 34. It will be noted that the rocking links 30, 30' are journalled on the shaft 14 by means of ball bearings 35 and hence move freely of said shaft. Keyed to said shaft however is rocking arm lever 36 which rests on the top of connecting rod 31, as best shown in Fig. 5. Therefore the upward movement of connecting rod 31 will lift the feeler 10 but will have no connection therewith on its downward stroke provided only that the pile is high enough to interrupt the downward fall of the feeler before it reaches the bottom of its stroke. Actually the downward travel of the feeler 10 may be limited by a stop 37 against which the rocking arm lever 36 will strike if allowed to descend sufficiently far.

In order to register the impulse created by the limited downward travel of the arm 36 and hence the height or level of the pile, the following mechanism is provided; arm 36 has a rearward extension in the form of an ear 38 to which is pivoted a link 39 by means of which to actuate the indicator-transmitter mechanism which is housed in housing 40 above housing 21a for the actuating mechanism above described. A shaft 45 rotates in journals 46, 47. Pivotally connected with link 39 by means of an arm 48 is a first drum or hub 49, whereby the rocking motion of the arm 36 is reproduced in said drum 49, it being noted that said drum is freely rotatable on shaft 45. Keyed to shaft 45 is a second or positioner drum 50 to which is attached vane 51. Positioner drum 50 is normally held against rotation by means of a brake 52 pivoted at pivot 53 and urged against the drum by spring 55, the tension of which is adjustable by means of screw 56 and nut 57 held on a bracket arm 58. Brake 52 is periodically released whenever connecting rod 31 reaches the bottom of its travel, for the reason that link 59, pivoted to rocking arm 30' (see Fig. 6) and having an adjustable tip 60, strikes the brake arm to the right of pivot 53, thereby lowering the brake and freeing the drum 50. The drums 49 and 50 are resiliently connected as follows: Brake controlled drum 50 has attached thereto a pair of leaf springs noted by 61, 61', the same embracing the shaft 45 and having ends fixed to a boss 62 on the drum 50. Drum 49 has a pin 63 which when moved to the left causes the leaf spring 61' to move with it (but not the drum 50, since it is held by the brake 52). Therefore the position of the leaf spring 61' will register the end of the down stroke of feeler 10. Assuming that the top of connecting rod 31 continues to move downwardly (as it will since desirably the stop 37 will interrupt the downward move of arm 36 a slight distance above the lowermost travel of the top of connecting rod 31), the link 59 will operate to release the brake 52, thus allowing drum 50 to move so as to enable the leaf springs to assume the closed position in which the same are both in contact with the pin 63. Thereby the position of drum 50 and the vane 51 will be determined by the lowermost travel of the feeler 10, whereby position of vane 51 will indicate the level of the pile. Thus the release of the brake occurs at a predetermined interval, nearly a half cycle, after the feeler begins its downward movement in its oscillation. On the upward stroke of the connecting rod 31, the pin 63 will move to the right (Fig. 5) against the tension of leaf spring 61. However, this will not disturb the vane 51 because of the action of brake 52. Drum 50 may carry a pin 64 against which spring 61 may act to aid in the alignment of the drums 49 and 50 with respect to one another.

While the position of the vane 51 will register the height of the pile, it is desirable to provide means whereby such vane may actuate mechanism for restoring the pile to a desired level, and for this purpose servo-mechanism comprising the Sylphon bellows 70 and attendant mechanism is provided. Bellows 70 is adjustably held in a slot 71 of bracket 72 by means of a nut 73 and washer 74, and is connected with a pipe 75 transmitting air under pressure. At the other end of the bellows a bleed valve is provided in the form of a ball 76 held against its seat by means of spring 77. The tip of the bellows to the left of the ball 76 comprises bleed passages 78, a tip 79 containing a pin or plunger 80 which extends into contact with the ball 76. It will be noted that the air pressure tends to expand the bellows, especially since it tends to seat the ball 76, whereas the spring action of the bellows 70 is such as to contract the bellows in absence of superatmospheric air pressure. Hence if the vane 51 moves to the left in Fig. 4, the spring 77 will tend to close the valve and stop the bleeding, whereby the air pressure will expand the bellows so as to cause the tip of the bellows and the plunger 80 to follow said vane 51 to the left. Having done so, further movement of the bellows will cause the pin 80 to partially unseat the ball 76 and hence again to bleed the bellows of its air. However, the equilibrium which is set up by the position leftward of that shown in Fig. 4 results in an increased air pressure and one which is substantially proportional to the displacement of the vane, since the characteristic of the spring action of the bellows 70 is substantially a straight-line one. (If the vane 51 is moved to the right in Fig. 4, the amount of the bleed is increased, resulting in a fall in pressure and allowing the bellows 70 to contract, thereby setting up a condition of equilibrium in which the air pressure is proportionally less.) As an example of air pressures which may be used, the air supply in pipe 75 may be from a source established at 17 pounds per square inch gauge. The air then flows through valve 81, flow restrictor 82 and flow indicator 83. Thus the variation in pressure caused by the operation of the vane 51 may cause the air pressure within bellows 70 to vary from 3 to say 15 pounds, corresponding, say, to the positions C and A respectively of vane 51, Fig. 4, as would be indicated on gauge 84. This, then, will cause the complement of this pressure to occur in pipe 85 and such variation in pressure may then be caused to operate whatever control mechanism is desired to vary the feed of material into the digester 12.

Figure 8 shows an alternate, electrically actuated servo-mechanism. In this form of device, vane 51' constitutes an electrical contact which wipes across a resistance 90. Referring to Fig. 9, it will be seen that the resistance 90, conductor 91, resistance 92, conductor 93, constitute the external circuit of the familiar Wheatstone bridge whereas wiper 51', conductor 94, unbalance detector and amplifier 95, wiper 96 for resistance 92, conductor 97, transformer secondary 98 and conductor 99 constitute with the foregoing the inner circuit. Thus when wiper 51' moves, it throws the circuit comprising detector 95 into unbalance, thereby causing same to actuate motor 100 to move wiper 96 through connector 101 until balance is restored. At the same time, indicator 102 is also actuated. Connector 101 may also actuate recorder 103 as shown. Both the servo-mechanism of Fig. 9 and that comprising bellows 70 are well known per se and therefore need no further detailed description and specification.

I claim:

1. In a level indicator for a pile of solid materials, a feeler, means for periodically moving same onto said pile, a drum, an indicator proper connected thereto, a brake for said drum, a pivoted positioner element, a linkage therefrom to said feeler to move said element in accordance with the movement of the feeler onto said pile, a resilient connection between said drum and said element, said brake normally keeping said drum from following the movement of said positioner element while permitting the energy acquired by the movement of said element to be stored in said resilient connection, means for momentarily releasing said brake at a predetermined point in the periodic operation of the first named means, thereby permitting said drum to move in response to the energy stored in said resilient connection and to thereafter be held by said brake in such position.

2. In a level indicator for a pile of solid materials, a feeler, means for periodically lifting and allowing same to fall freely upon the material of said pile, a drum, an indicator proper connected thereto, a brake for said drum, a pivoted positioner element, a linkage therefrom to said feeler to move said element in accordance with the downward movement of said feeler, a resilient connection between said drum and said positioner element, said brake normally keeping said drum from following the movement of said element while permitting the energy acquired by the movement of said element to be stored in said resilient connection, means for momentarily releasing said brake at a predetermined point in the periodic operation of the first named means, thereby permitting said drum to move in response to the energy stored in said resilient connection.

3. In a system for indicating and/or regulating the height of a pile of divided solid material, a mechanism comprising a feeler capable of resting on the surface of said material without substantial penetration thereinto, means for periodically raising said feeler and lowering it down on to the surface of the material, an impulse storing device, means to impart thereto impulses proportionate to the upward and downward strokes of the feeler, an indicator element responsive to said impulses, and means for releasing to said indicator element at a predetermined point in the periodic operation of the first mentioned means said impulses produced by said downward feeler stroke to the exclusion of said impulses produced by said upward feeler stroke.

4. In a system for indicating and/or regulating the height of a pile of divided solid material, a mechanism comprising a feeler capable of resting on the surface of said material without substantial penetration thereinto, means for periodically raising said feeler and lowering it down on to the surface of the material, an impulse storing device, a linkage connecting the same with said feeler to impart to said storing device an impulse proportionate to the downward stroke of the feeler, an indicator element responsive to said impulse, and means for releasing said impulse to said indicator element at a predetermined point in the periodic operation of the first named means.

5. In a level indicator for a pile of solids inside a pressure vessel, a feeler, a shaft for oscillating same so as to bring said feeler onto and away from said pile, a sleeve for said shaft adapted to carry same into a pressure vessel, an impulse storing device, means to impart thereto an impulse proportionate to the downward stroke of the feeler, an indicator element responsive to said impulse, and means for releasing said impulse to said indicator element at a predetermined interval following a continually recurrent point in the oscillation of said feeler.

6. In a system for indicating and/or regulating the height of a pile of divided solid material, a mechanism comprising a feeler capable of resting on the surface of the material without substantial penetration thereinto, means for periodically raising said feeler and lowering it down onto the surface of the material, a positioner element, a linkage connecting said positioner element with said feeler whereby to impart movement to said positioner which is proportionate to the total movement of the feeler, an indicator element, a resilient linkage connecting said positioner element with said indicator element such that the movement of said positioner element is transmitted to said indicator element when the latter is free to move, together with means for restraining the movement of the indicator elemen save during a predetermined interval within the periodic operation of the first named means whereupon the position of said positioner is transmitted to said indicator element so as to enable the latter to indicate the level of the pile.

7. In a system for indicating and/or regulating the height of a pile of divided solid material, a mechanism comprising a feeler capable of resting on the surface of the material without substantial penetration thereinto, means for periodically raising said feeler and lowering it down onto the surface of the material, a positioner element, a linkage connecting said positioner element with said feeler whereby to impart movement to said positioner which is proportionate to the total movement of the feeler, an indicator element, a resilient linkage connecting said positioner element with said indicator element such that the movement of said positioner element is transmitted to said indicator element when the latter is free to move, together with means for restraining the movement of the indicator element comprising a brake and means for releasing same during a predetermined interval within the periodic operation of the first named means.

8. In a system for indicating and/or regulating the height of a pile of divided solid material, a mechanism comprising a feeler capable of resting on the surface of the material without substantial penetration thereinto, means for periodically raising said feeler and lowering it down onto the surface of the material, a positioner element, a linkage connecting said positioner element with said feeler whereby to impart movement to said positioner which is proportionate to the total movement of the feeler, an indicator element, a resilient linkage connecting said positioner element with said indicator element such that the movement of said positioner element is transmitted to said indicator element when the latter is free to move, together with means for restraining the movement of the indicator element comprising a brake, and linkage between said feeler raising means and said brake for releasing the latter during a predetermined interval within the periodic operation of the first named means.

9. In a device for measuring and controlling the level of a granular-like solid material, a feeler capable of resting on the surface of the material without sinking thereinto, a continuously rotating crank with linkage system for raising said feeler above the level of the material and lowering it down onto the surface of the material, a first indicator arm connected with the feeler indicating the position of the feeler at all times, a second indicator arm flexibly connected with said first indicator arm and adapted to move in conjunction with said first indicator arm, a friction brake arranged to restrain said second indicator arm, together with means for releasing said brake during a predetermined interval periodically recurrent in the movement of said crank.

References Cited in the file of this patent

UNITED STATES PATENTS

| Number | Name | Date |
| --- | --- | --- |
| 2,032,016 | Hitner | Feb. 25, 1936 |
| 2,352,080 | Crowley et al. | June 20, 1944 |
| 2,394,220 | Wagner | Feb. 5, 1946 |
| 2,568,332 | Genovese | Sept. 18, 1951 |